United States Patent
Fries

[15] 3,671,967
[45] June 20, 1972

[54] MULTIPLE ANTENNA INSTRUMENT LANDING SYSTEM

[72] Inventor: James R. Fries, Bellevue, Wash.
[73] Assignee: The Boeing Company, Seattle, Wash.
[22] Filed: May 11, 1970
[21] Appl. No.: 36,223

[52] U.S. Cl. .................. 343/108 R, 343/106 R, 343/107, 343/109
[51] Int. Cl. .................................................. G01s 1/16
[58] Field of Search .................. 343/109, 108 R, 107, 106

[56] References Cited

UNITED STATES PATENTS

| 2,519,521 | 8/1950 | Weighton | 343/109 |
| 2,760,190 | 8/1956 | Henrici | 343/106 |
| 3,376,573 | 4/1968 | Read | 343/107 |

Primary Examiner—Benjamin A. Borchelt
Assistant Examiner—Richard E. Berger
Attorney—Glenn Orlob, Kenneth W. Thomas and Conrad O. Gardner

[57] ABSTRACT

An instrument landing system (ILS) having distributed localizer receiving antennas and localizer signal information processing to provide a composite guidance signal having reduced localizer beam noise for reduced lateral touchdown dispersion in automatic landing systems. A plurality of conventional localizer antennas are positioned at several laterally displaced points across the approach path along the wings of an aircraft and the corresponding plurality of received localizer beam deviation signals received by each of these antennas is individually processed by a localizer receiver system with the audio course deviation signals developed from the several antennas being averaged to provide the composite guidance signal for use in autopilot or crosspointer indicator.

13 Claims, 4 Drawing Figures

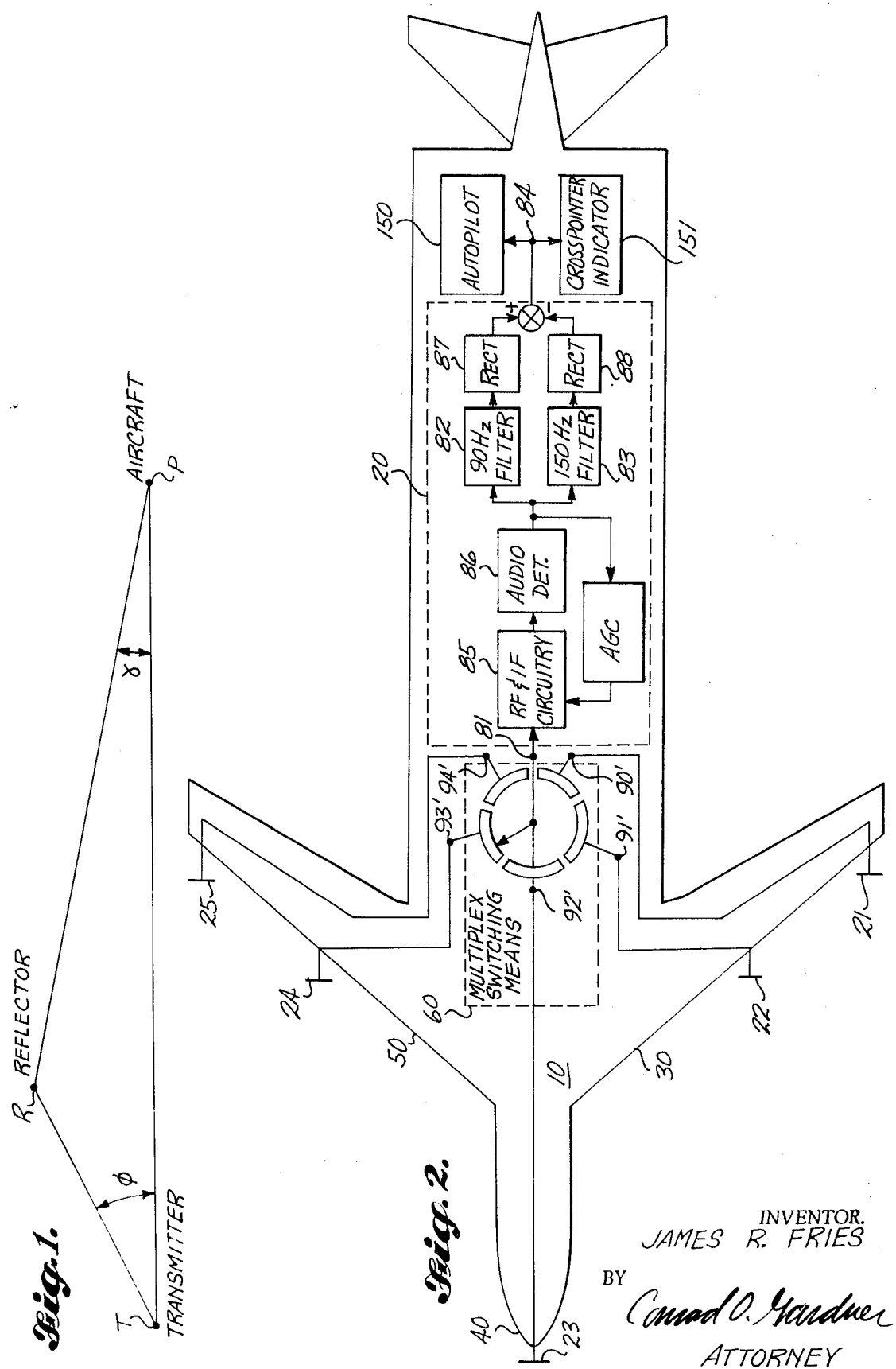

INVENTOR.
JAMES R. FRIES

BY Conrad O. Gardner

ATTORNEY

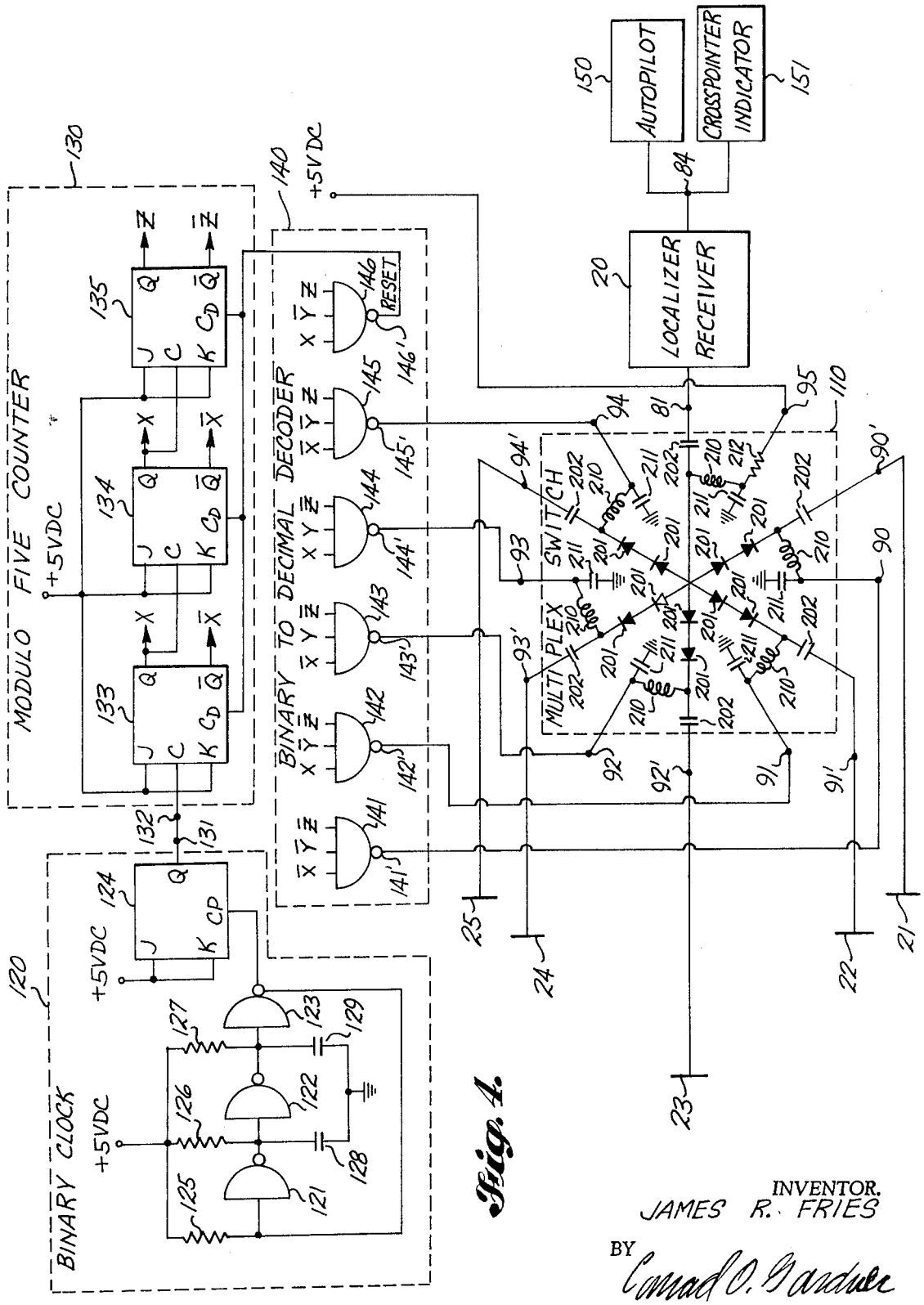

MULTIPLE ANTENNA INSTRUMENT LANDING SYSTEM

This invention relates to a method and apparatus for processing ILS localizer information. More particularly, it relates to a multiple antenna instrument landing system which reduces the adverse effects of ILS beam bends on the performance of automatic landing aircraft.

Presently deployed state of the art commercial aircraft automatic landing systems derive their lateral guidance information from the ILS localizer. The localizer characteristics are therefore of critical importance in determining the performance that can be obtained by these autoland systems.

The ILS localizer operates in the radio frequency band between 108 and 112 megahertz. It uses an antenna located about 1,000 feet beyond the far end of the runway. This antenna produces two beams. One beam is amplitude modulated with a 90 Hz tone and the other is amplitude modulated with a 150 Hz tone. One beam is angled slightly to the right of the runway and the other to the left. An approaching aircraft receives signals from both of these beams. The 90 Hz and 150 Hz modulating tones are separated by a pair of filters in the localizer receiver and are rectified to produce two signals that are proportional to the depth of modulation of the 90 Hz and 150 Hz tones. The difference of these signals is taken to form the localizer output signal which is then proportional to the difference in depth of modulation (d.d.m.). Ideally the d.d.m. varies linearly with angular displacement from the course center. When the aircraft is on course center, the d.d.m. is zero and the localizer receiver output is zero. If the aircraft deviates from the center, the amplitude of the localizer output signal is directly proportional in a substantially linear manner with the angular displacement of the aircraft from the runway centerline and provides the lateral guidance information signal.

In any real localizer installation, the aircraft receives energy coming directly from the transmitter antenna and energy that is reflected from objects on the ground. The reflected signals have an improper balance between their 90 and 150 Hz modulation components and differ in phase from the direct signals. When they combine in space with the direct signal, an extremely complex interference pattern is created. An approaching aircraft with the conventional omnidirectional type ILS antenna senses the vector sum of all arriving signals. It therefore does not distinguish between the direct signals containing the correct guidance information and the reflected signals containing erroneous information. The result is that the localizer receiver output contains a noise like signal termed "beam bends" by those skilled in the art, in addition to the desired guidance signal containing correct information about lateral position of the aircraft with respect to runway centerline.

Prior attempts to reduce beam bends have been by preventing illumination of ground reflectors and thereby reducing the amount of energy reaching the aircraft omnidirectional antenna via indirect paths. This has been accomplished by improvements in a directive arrays at the transmitter. Unfortunately, the relatively low frequency of ILS systems has placed a limit on the directivity that can be obtained with the present state of the art.

A further approach in reducing beam bonds utilizes the improvement in directivity of the approaching aircraft's ILS receiving system. The amount of directivity that can be achieved is ultimately limited, however, by the lateral dimension of the aircraft, i.e., its wingspan. For an aircraft having a 100-foot span available for antenna aperture it would be possible to achieve about a six-degree 3 db beamwidth receiving pattern. Using the entire wing for a conventional antenna is, of course, impractical. However, this condition can be approached by employing a number of receiving antenna elements distributed at separate points along the wings. A directive pattern would be created which would have a multilobe structure which would suppress interfering signals arriving at angles around the pattern nulls. Increasing the number of elements in the antenna array would suppress pattern side lobes. Summing the radio frequency (r.f.) signals in such manner, however, results in a severe disadvantage. The receiving antenna pattern produced by the array of elements is fixed with respect to the aircraft centerline. Heading deviations then will cause strong variations in received signal level as the beam wanders about, and complete loss of signal will occur when a null in the receiving antenna pattern is directed toward the localizer transmitter. Heading stabilization would thus be required; however, such an approach is deemed impractical because of equipment complexity.

It has been often incorrectly assumed that beam bends are simply displacements of portions of the entire beam structure to the right or left of the runway alignment. In reality, the effects of reflected signal interference are much more complex. A standing wave pattern is created in space that results in errors in course center position and course sensitivity as well as complete reversals in course sense. An understanding of the real situation described hereinafter is very important to an understand of how the solution of the problem is achieved according to the present invention.

Where a plurality of separate receiving antennas are distributed along the wings of an aircraft and thus separated in space, the noise or beam bends seen by each will not be identical but each will be, however, a complex function of the terrain-scattering conditions and the path lengths followed by the scattered energy to each antenna. By properly selecting the lateral spacing between the antennas it is possible to cause the beam noise seen by the separated antennas to be in phase opposition. Averaging the deviation signals then produces a cancellation of the distortion. By this means, beam noise is reduced by a factor of three or more over the frequency band of most importance for large aircraft guidance.

Insight into how beam noise reduction is achieved in accordance with embodiments of the present invention can be had by considering a simplified case of ILS beam bends. If only one major terrain reflector exists, it is possible to establish the form of beam bends that will be produced. The receiver output for this simplified situation has the form:

$$I = \frac{Ky}{R} + \hat{\epsilon} \sin 2\pi \left(\frac{x}{X} - \frac{y}{Y}\right)$$

where
$\hat{\epsilon}$ is the error amplitude,
$x$ is a distance along track,
$y$ is cross track displacement,
$X$ is the along track wavelength of the interference pattern in space,
$Y$ is the across track wavelength of the interference pattern,
$R$ is range to the transmitter,
$K$ is a scale constant,
The term $Ky/R$ is the desired guidance information and the sinusoidal term is the beam noise component. The beam noise amplitude $\hat{\epsilon}$ is determined primarily by the angular location of the terrain reflector off the runway centerline and may be considered a constant.

The outputs of three localizer receivers having their antennas separated by $\Delta y$ are given by:

$$I_0 = \frac{Ky}{R} + \hat{\epsilon} \sin 2\pi \left(\frac{x}{X} - \frac{y}{Y}\right)$$

$$I_R = K\left(\frac{y + \Delta y}{R}\right) + \hat{\epsilon} \sin 2\pi \left(\frac{x}{X} - \frac{y + \Delta y}{Y}\right)$$

$$I_L = K\left(\frac{y - \Delta y}{R}\right) + \hat{\epsilon} \sin 2\pi \left(\frac{x}{X} - \frac{y - \Delta y}{Y}\right)$$

Summing these three signals and dividing by three yields $$\frac{I_0 + I_R + I_L}{3} = \frac{Ky}{R} + \frac{\hat{\epsilon}}{3}\left(1 + 2\cos\frac{2\pi\Delta y}{Y}\right)\sin 2\pi\left(\frac{x}{X} - \frac{y}{Y}\right)$$

It can be seen that the desired guidance component $Ky/R$ is unaffected but the beam noise term is modified by the factor $$\frac{1}{3}\left(1+2\cos\frac{2\pi\Delta y}{Y}\right)$$

This factor describes the amount of noise suppression as a function of antenna spacing ($\Delta y$) and Y. Y is determined by the angle of arrival ($\gamma$) of the reflected signal wavefront; therefore, since $Y = \lambda/\sin\gamma$, the amount of error suppression depends upon this angle.

The along track wavelength ($X$) of the "beam bend" structure is also a function of the angle $\gamma$. Therefore, it is possible to determine the frequency of the beam error signal that would be seen by an approaching aircraft having a speed $V$. The frequency is given by $$\frac{V}{X} \text{ or } \frac{V(1-\cos\gamma)}{\lambda}$$

Using this relationship, the beam error suppression can be plotted as a function of beam error frequency and is found equivalent to a gain plot of a linear filter operating on the beam noise with transmission nulls produced in the important guidance frequency regions. These nulls will reject portions of the beam noise but will not affect the desired guidance signal.

The systems of the present invention which provide the aforementioned substantial improvements in the quality of ILS localizer information in the guidance signal are achieved by employing several receiving antennas distributed on the aircraft at laterally displaced points across the approach path, preferably along the wings and on the fuselage. The composite beam deviation signal is produced by averaging the deviation signals present at each antenna. The signals from each of the antennas are detected and converted to deviation signals prior to averaging in order to eliminate effects of the r.f. phase differences between each signal. Where the aircraft has been equipped with a fully triple redundant autoland system, and separate localizer receivers are available for at least three antennas, this invention may be practiced in accordance with one embodiment of the invention with a minimum amount of additional equipment including the addition of a pair of wing mounted antennas and circuitry for combining the individual localizer deviation signals in the manner previously described to provide the composite guidance signal.

In accordance with a further embodiment of this invention where additional receivers are unavailable and/or it is desired to increase the number of antennas to produce the desired level of improvement, multiplexing means are utilized which allow the use of a single conventional ILS receiver with multiple antennas and provides performance equivalent to that produced in the system of the first embodiment where plural receiving channels are available for individual antenna signal processing.

Other and further features, objects and advantages of the invention will be more readily perceived from a perusal of the following detailed descriptions of specific illustrative embodiments of various principles of the invention in accordance with the foregoing and as well from the appended claims and the illustrative drawings accompanying this application.

IN THE DRAWINGS

FIG. 1 is a schematic drawing graphically illustrating a simplified reflection situation helpful in an analysis and understanding of beam distortion.

FIG. 2 is a schematic diagram in block form of one embodiment of the ILS receiving system circuitry utilized to obtain the improved guidance signals in accordance with the principles of this invention.

FIG. 4 is a schematic diagram showing one specific circuit embodiment of the multiplex switching means shown in FIG. 3.

Figure 3:
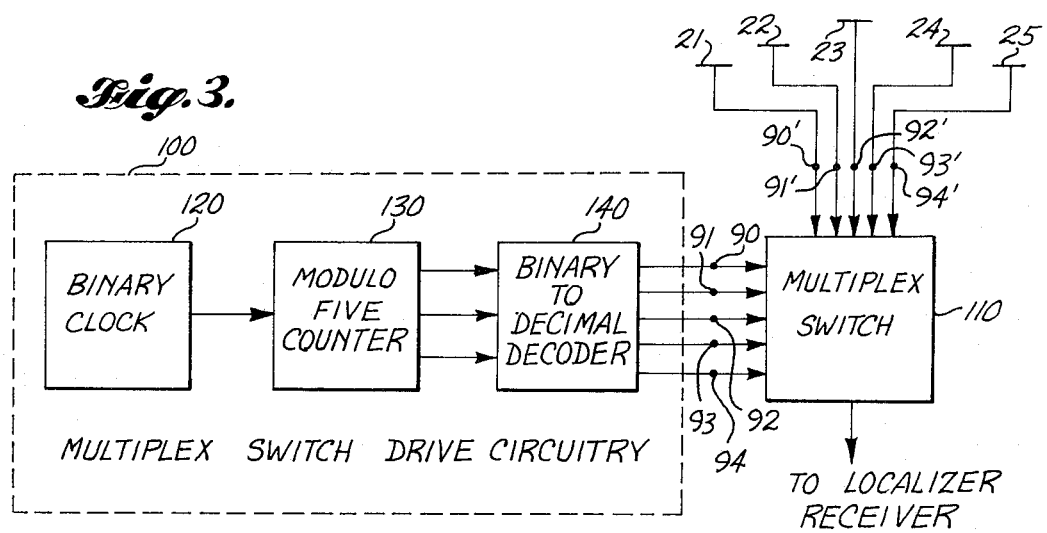
FIG. 3 is a schematic diagram in block form of the multiplex switching means shown in FIG. 2.

An analysis of beam distortion can be greatly simplified by reducing the problem to a determination of the effects of a single ground reflector. This is of course a highly idealized situation. Once the solution is available for a single point, however, the principle of superposition can be applied to extend the analysis to as complex a situation as desired. The total effect of many scatterers is simply the sum of the effects of the individual scatterers. This holds true as long as the signal received directly from the transmitter is large compared to the amount of ground scattered signal.

The simplified reflection situation is illustrated in FIG. 1. An aircraft located at P is approaching the localizer transmitter at T. A reflector at R intercepts a portion of the localizer radiation and reflects it to the approaching aircraft. The aircraft then sees two arriving signals. One follows the path TP and contains the desired guidance information, while the other follows the path TRP and is an interfering signal. The nature of the beam distortion seen at P depends upon how the ILS receiver responds to the combined direct and reflected signals.

It can be shown that with a signal interfering reflector the localizer receiver output signal (I) can be written as:

$$I = (KY)/R + AI_r \cos\theta$$

Where K is a scaling factor,
Y is the lateral offset of the sensing antenna from the runway centerline,
R is the range to the transmitter,
A is determined by the scattering cross section of the reflector,
$I_r$ is the localizer deviation signal present at the reflector,
$\theta$ is the RF phase difference between the direct and reflected signals at the sensing antenna.

The term $KY/R$ is the desired guidance information and the term $AI_r \cos\theta$ is the beam distortion resulting from the reflector. To simplify the analysis further, the term $AI_r$ can be considered a constant. Then the beam distortion can be seen to vary only with the cosine of the phase difference ($\theta$) between the direct and reflected signals. The general shape of the beam bend structure can then be determined simply by evaluating $\theta$ at points on and around the approach path. $\theta$ is given by $$\theta = 2\pi\Delta L/\lambda.$$

Where $\Delta L$ is the propagation path length difference $TR+RP-TP$ in FIG. 1 and $\lambda$ is the r.f. carrier wavelength. Plots of the beam distortion components computed in this manner for numerous reflector locations were made showing the distortion on the extended runway centerline and along various offset paths on either side of the centerline. Such plots showed the general character of the beam distortion and revealed the differences between the bend structure at the various offset positions. Certain modifications in the preceding analysis make it possible to describe the noise suppression achievable as a function of the instantaneous noise frequency. When this is done, the operation of the present multiple antenna instrument landing system can be considered equivalent to a linear filter operating on the beam noise. It reduces certain important beam noise frequency components while having no effect on the desired guidance information. This contribution is important in autopilot design since conventional localizer filtering itself introduces phase lags which can adversely affect autopilot stability. Bode plots of noise suppression characteristics for a five-antenna configuration showed the characteristics which can be achieved. These characteristics can be modified by varying the spacing between antennas and also by weighting the signals in the system prior to averaging. In such manner, the characteristics of the systems disclosed can be optimized for use with a particular autopilot having given response characteristics.

Turning now to FIG. 2, there is shown an embodiment of a multiple antenna instrument landing system in an aircraft 10 requiring a single conventional ILS receiver 20 which may be a type RNZ 26c ILS receiver manufactured by Bendix Corp.

or Collins Radio type 51-RV-2 receiver. Five localizer antennas 21, 22, 23, 24, and 25 are positioned laterally displaced points across the approach path. These localizer antennas 21, 22, 23, 24, and 25 may comprise type 37J3 antennas manufactured by the Collins Radio Company. A first pair of antennas 21 and 25 are located on the left and right wing tips of left and right wings 30 and 50, respectively. A second pair of antennas 22 and 24 are positioned at midwing locations of left and right wings 30 and 50, respectively. A single antenna 23 is located on the fuselage 40 although antenna 23 may alternatively be located at the fin of aircraft 10. Multiplex switching means 60 sequentially connects the r.f. input port 81 of ILS receiver 20 to each of the antennas 21, 22, 23, 24, and 25 and a time averaging described hereinafter in more detail is accomplished within 90 Hz filter 82 and 150 Hz filter 83 of ILS receiver 20.

The specific performance requirements of multiplex switching means 60 and how such requirements are achieved are detailed in the following; however, the over-all objective of multiplex switching means 60 is to cause an output composite guidance signal to be produced at output terminal 84 of ILS receiver 20 which is equal to the average of the course deviation signals sensed by the five antennas 21, 22, 23, 24, and 25. Briefly stated, this is accomplished by causing multiplex switching means 60 to sequentially switch ILS receiver 20 to each of ILS antennas 21, 22, 23, 24, and 25 at a rate rapid enough to produce an averaging effect in 90 and 150 Hz audio filters 82 and 83. Multiplex switching means 60 connects ILS receiver 20, in turn, to each antenna port and remains on each port for a time interval which will hereinafter be termed the dwell time. The time for switching between ports is negligibly small so that ILS receiver 20 is always connected to one of antennas 21, 22, 23, 24 or 25. During the time interval that ILS receiver 20 is connected to one of antennas 21, 22, 23, 24 or 25, the r.f. signal at that antenna is fed through receiver RF and IF circuitry 85 and audio detector 86 produces a voltage level proportional to the r.f. level. Since the r.f. level is varying with the 90 and 150 Hz amplitude modulations, the detector 86 output level is then a brief sample of 90 and 150 Hz tones present at the aforementioned antenna. When multiplex switching means 60 sequences to a further antenna, the detector 86 output level will change to a level proportional to the r.f. level at the further antenna and will be a sample of its 90 and 150 Hz tone levels. The tone filtering in ILS receiver 20 will reject the high frequency switching components and will produce a smooth sinusoidal tone signal having an amplitude equal to the average of the tone levels at each antenna. When the outputs of the tone filters are combined, a composite localizer deviation signal equal to the average deviation signal will be produced which is the desired result.

Up to this point the possibility of different average r.f. levels at each switch port and the operation of the receiver automatic gain control have been ignored. If the average r.f. levels differ due to different antenna gains or cable losses, the averaging process will be affected and errors may exist in the localizer output. It is necessary, therefore, to establish the degree of these effects and to set tolerances on the allowable differences in r.f. levels. If it is assumed that the receiver AGC operates as it should to maintain the D.C. detector output level constant, the receiver output deviation current ($I_T$) can be expressed by:

$$I_T = \frac{1}{5A_{ave}} [A_1 I_1 + A_2 I_2 + A_3 I_3 + A_4 I_4 + A_5 I_5] \quad (1)$$

Where $A_{ave}$ is the average of the five r.f. carrier levels,
$A_1$, $A_2$, $A_3$, $A_4$ and $A_5$ are the amplitudes of the r.f. carriers at each switch port.
$I_1$, $I_2$, $I_3$, $I_4$ and $I_5$ are the deviation current levels that would be produced by the individual r.f. signals.

The contribution of each individual deviation signal to the total signal is weighted by the ratio of its carrier amplitude to the average carrier amplitude of the five signals. The significance of this effect can be illustrated by the following example. Near touchdown, a typical localizer will produce the following deviation currents at each of the antennas, assuming that they are spaced 30 feet apart and that the aircraft is on beam center.

| | |
|---|---|
| $I_1$ (left wing tip) | = +30 microamps |
| $I_2$ (left mid wing) | = +15 microamps |
| $I_3$ (center) | = 0 microamps |
| $I_4$ (right mid wing) | = −15 microamps |
| $I_5$ (right wing tip) | = −30 microamps |

If all of the r.f. levels are equalized, the desired deviation current of zero microamps will be produced. However, if both left wing antenna signals are 1.5 db too low, the following values would exist:
$A_1 = 1.19$
$A_2 = 1.19$
$A_3 = 1.00$
$A_4 = 0.841$
$A_5 = 0.841$
$5A_{ave} = 5.062$ Substitution of these values in Equation 1 yields an error in indicated deviation of $I_T = +3.11$ microamps. The values used in this example represent an unlikely worst case conditions that could exist if a 3 db variation were allowed between the r.f. power levels. The 3.11 microamps error is within the normal ILS receiver centering tolerances and would produce only a 6-foot lateral offset in the aircraft touchdown point. It was therefore concluded that up to a 3 db difference in antenna gains and cable losses could be tolerated.

Another factor that must be considered is the operation of the system during beam capture and on the downwind leg of an approach pattern. At these times the r.f. signals from the localizer are received from very large angles and the directivity patterns of the various antennas will greatly affect the power levels sensed by each antenna. It is virtually impossible to achieve omnidirectional patterns for the wing antennas because of their location relative to the surrounding aircraft structure. Therefore, it is impossible to equalize the signal levels for all conditions. One solution to this problem would be to employ the multiple antenna system only after the aircraft has captured the beam and is reasonably stabilized on the approach course. Another possibility would be to use a sequentially gated AGC in the receiver. Initial flight test evaluation has indicated, however, that the effects on the composite deviation signal may be small enough to be negligible. On numerous landing approaches, satisfactory beam captures were accomplished using the multiplex switch system and satisfactory performance was obtained on the downwind leg of the pattern.

Another important factor in the switch operation is the sampling rate and the dwell times. The sampling rate must be high enough to produce proper averaging in the filters but must be low enough to maintain most of the signal information within the pass band of the receiver. Fortunately the passband of most VOR-ILS receivers is much greater than would be needed for ILS reception. This allows operation at quite high switching rates. The Collins Radio type 51-RV-2 receiver has a 6 db bandwidth of 50 KHz. Laboratory measurements have indicated that switching rates of up to 10 KHz can be used without significant loss of performance. The lowest usable switching rate is established by the responses of the 90 and 150 Hz filters. These two filters have different high frequency roll-off characteristics. Therefore, it is necessary to switch at a rate several octaves above the filter cut-off frequencies. Measurements have shown that switching rates above 1 KHz are adequate. At switching rates below 1 KHz there is a possibility that the switching harmonics in the 150 Hz filter output will significantly exceed those in the 90 Hz filter output. This would produce a fly bias in the receiver output deviation current. The desired band of switching frequencies thus extends from 1 KHz to 10 KHz.

Certain airports employ localizers that use two separate transmitters. These two transmitters are intentionally offset in frequency from each other and can produce an audio frequency beat in the receiver at the r.f. difference frequency. Presently this difference frequency is 8 Kc ± 4 Kc. This signal can interact with switching harmonics to produce low frequency components that produce errors in the deviation signal. Another factor to be considered is the audio identification tone transmitted by the localizer, and the possible use of the localizer AM communication capability. It is doubtful that either of these would significantly affect the sensed deviation because of their low percent modulations. Reception and intelligibility of these signals may, however, be adversely affected by the switching harmonics. To avoid this, the switching rate should preferably be higher than the highest audio frequency components passed by the receiver audio output circuitry. The cut-off frequency of the audio filter in the Collins Radio type 51-RV-2B receiver is 3,750 Hz. Consideration of the preceding factors and inflight experimentation with the present system have led to selection of a 5.5 Kc switching rate within the aforementioned band of desired frequencies.

In order to establish the basic averaging characteristics of the system shown in FIG. 2, five simulated localizer signals were supplied to switch ports 90', 91', 92', 93' and 94'. In establishing the basic averaging characteristics of the system for various sampling rates with equalized r.f. input levels, it was found that the output deviation signal equaled the average of the five input deviations for any combination of input deviations. As long as the r.f. levels of the signals were equalided (within 1 db) the switching rate of multiplex switching means 60 had no effect on this performance. Switching rates from 400 Hz to 10 KHz were investigated. When the r.f. levels were not equalized, much larger switching frequency components were present in the receiver and the switching rate had a more significant effect on the output deviation. With all five inputs set to zero deviation but with one of the input r.f. levels 20 db below the other four, an erroneous fly left deviation of 5.7 microamps was produced when the switching rate was set to 400 Hz. At 500 Hz this error reduced to 2.3 microamps and at 667 Hz it was 0.5 microamps. These fly left biases result from the unequal attenuation of the switching harmonics by the 90 and 150 Hz filters. The rectified output of the 150 Hz filter is larger than that from the 90 Hz filter and yields a fly left error in the output deviation signal. To avoid this error, all later testing was done at switching rates of 1 KHz or above. For these higher rates there was no detectable error in the deviation signal due to this effect. A series of measurements was made to determine the effects of unequal r.f. levels on the composite deviation signal. A comparison of the measured and theoretical values was made. From the data it could be seen that the theoretical expressions are a reasonably good estimate of the composite deviations as long as the single part r.f. levels were within ±10 db of the other signals. For differences in r.f. level of greater than ±10 db the measured values are constantly below those predicted by theory. This occurred because the large differences in r.f. level produce large amplitude signals in the receiver which exceed the normal linear operating range of the circuitry. The theoretical expression thus proved useful in determining system performance for small differences in r.f. levels. Theoretical description of performance in the presence of large r.f. level differences would be extremely difficult and is generally unnecessary since it is clear that unacceptably large errors in the composite deviation are produced under these conditions.

A series of measurements was made to investigate the possibility of using unequal switch dwell times to weight the individual signals present at switch ports 90', 91', 92', 93', and 94'. If the dwell time on a particular antenna is increased relative to the other antenna dwell times, the contribution of that antenna's deviation to the total composite deviation will be increased. Thus, by controlling the dwell times of the switch at each antenna port, it is possible to establish a weighted averaging of the component signals. In this test four of the input ports were fed signals with zero deviation and the dwell time on these ports was set at 200 microseconds. The fifth port was fed a signal with a 50 microamp deviation and the dwell time on this port was varied from 40 to 600 microseconds. A plot of these measurements along with a computed curve showing the expected performance was made. The computed curve was based on the assumption that weighting of each component deviation signal varied with the ratio of its dwell time to the total of all five dwell times. The composite deviation signal ($I_T$) is then given by:

$$I_T = \frac{T_1}{T_t}I_1 + \frac{T_2}{T_t}I_2 + \frac{T_3}{T_t}I_3 + \frac{T_4}{T_t}I_4 + \frac{T_5}{T_t}I_5 \qquad (1)$$

where $T_1, T_2, T_3, T_4, T_5$ are the dwell times on each antenna port,
$I_1, I_2, I_3, I_4, I_5$ are the deviation components at each antenna,
$T_t = T_1 + T_2 + T_3 + T_4 + T_5$.

From the data it could be seen that the measured and theoretical values agreed quite well over the region investigated. It appeared then that weighting of the signals could be accomplished by modifying the dwell times of the switch and that Expression 1 is adequate for describing the weighting operation when the r.f. levels are equalized. In the case of variations in dwell time with unequal r.f. levels, it is apparent that the dwell times could be adjusted to compensate for small differences in r.f. levels.

In FIG. 1, typical lateral spacing for the antennas 21, 22, 23, 24, and 25 would be 30 feet. This spacing, however, can be adjusted to adapt to the structure of a particular aircraft. The spacing between antennas 21, 22, 23, 24, and 25 determines the bandwidth and center frequency of the beam noise suppression characteristic. A 30-foot spacing between the five antennas produces near optimum suppression of beam noise over the frequency band of most importance to present transport aircraft autopilot systems. While the particular type of prior art antenna which may be utilized at 21, 22, 23, 24, and 25 has been previously defined, it should be noted that various types of antennas capable of receiving localizer signals within a sector of at least± 30° of the nose 40 of aircraft 10 can be utilized in the present system. Wing antennas 21, 22, 24, and 25 are preferably of a flush-mounted cavity type to minimize drag.

Figure 5:
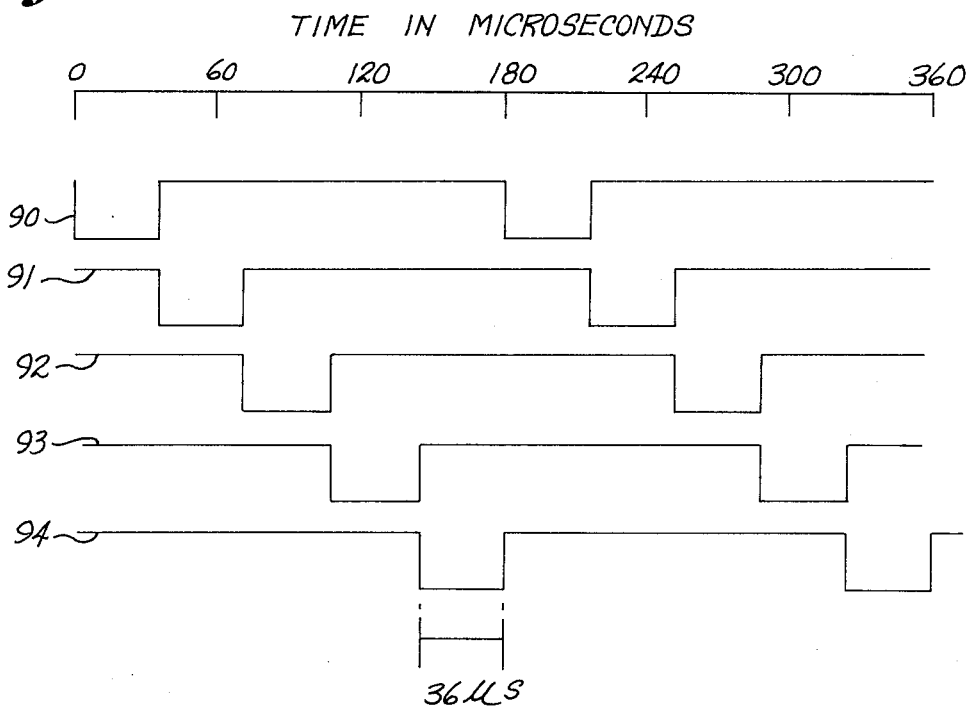
FIG. 5 is a timing diagram of the gating pulses generated by the multiplex switch drive circuitry showing timing sequence and dwell time during which the individual antennas are connected by the multiplex switch to the localizer receiver.

A block diagram of the multiplex switching means of FIG. 1 is shown in FIG. 3. Multiplex switch drive circuitry 100 generates gaging pulses which are applied to multiplex switch 110. The timing sequence of the gating pulses is shown in the timing diagram of FIG. 5. When a negative pulse is generated by multiplex switch drive circuitry 100 and is present at terminal 90 of multiplex switch 110, multiplex switch port 90' connects antenna 21 through to input port 81 of ILS receiver 20 for a dwell time or period of 36 microseconds as can be seen from the timing diagram of FIG. 5. At the end of this time period, multiplex switch drive circuitry 100 provides a negative gating pulse to terminal 91 of multiplex switch 110 which causes multiplex switch 110 to switch to switch port 91' for a period of 36 microseconds during which time antenna 22 is connected through multiplex switch 110 to the input port 81 of ILS receiver 20. Upon the termination of this time period, multiplex switch drive circuitry 100 provides a negative gating pulse at terminal 92 as seen from the timing diagram of FIG. 5 which shows the presence of the pulse at this time at terminal 92. The presence of this negative gating pulse at terminal 92 of multiplex switch 110 causes the switch to provide coupling and transmission of the ILS signal received by center or nose antenna 23 connected to multiplex switch port 92' on through multiplex switch 110 to the input port 81 of ILS receiver 20. Subsequent presence of negative gating pulses at terminals 93 and 94 of multiplex switch 110 for the periods shown in the timing diagram of FIG. 5 causes multiplex switch 110 to sequentially couple antennas 24 and 25 for the respective time periods to the input port 81 of ILS receiver 20. As noted from the timing diagram of FIG. 5, multiplexing of the five antennas is accomplished in a time period of 180 microseconds with a dwell time of 36 microseconds during which an individual antenna remains coupled to the input port 81 of ILS receiver 20. The cycle is repeated in the manner shown in the timing diagram.

The above-mentioned negative gating pulses required to drive multiplex switch 110 are generated by multiplex switch drive circuitry 100 which includes, as shown in the block diagram of FIG. 3, a binary clock 120 for generating reference timing pulses which are transmitted to modulo five counter 130, and binary to decimal decoder 140.

Turning now to FIG. 4, there is shown in detail a schematic diagram showing one embodiment of the logic circuits arranged to provide the binary clock 110, modulo five counter 130 and binary to decimal decoder 140 necessary to generate the gating pulses to drive multiplex switch 110.

First, second, and third NAND gates 121, 122, and 123 are series-coupled with the output of the third NAND gate 123 fed back to the input of the first NAND gate 121. The output of third NAND gate is also coupled to the CP input terminal of flip-flop circuit 124. The resistance values of resistors 125, 126, and 127 connected between the inputs of NAND gates 121, 122, and 123 and the positive 5-volt D.C. source together with the capacitance values of capacitors 128 and 129 connected between the inputs of second and third NAND gates 122 and 123 and reference potential determine the frequency of the clock pulses provided at output terminal 131 of binary clock pulse generator 120 in the manner known to those skilled in the art. NAND gates 125, 126, and 127 may comprise Texas Instruments type SN 7401 N NAND circuit. Flip-flop circuit 124 comprises a Texas Instruments type SN 7473N flip-flop circuit. The input terminal 132 of modulo five counter 130 is coupled to the output terminal 131 of binary clock 120 to receive the generated clock pulses. Modulo five counter 130 comprises first, second, and third J-K flip-flop circuits 133, 134, and 135 connected in known manner to provide binary signals for driving decoder 140. Flip-flop circuits 133, 134, and 135 may comprise Texas Instruments type SN 7473N flip-flop circuit devices. The X and $\bar{X}$ output pulses of first, second and third J-K flip-flop circuits 133, 134, and 135 are transmitted to various inputs of the six NAND gates 141, 142, 143, 144, 145, and 146 in the manner indicated in the legends at the three inputs of each of the above-identified NAND gates. In this manner, binary to decimal decoding is achieved at the outputs 141', 142', 143', 144' and 145' of the respective NAND gates 141, 142, 143, 144 and 145 while the remaining NAND gate 146 provides the reset pulse at output terminal 146' thereof. The output terminals 141', 142', 143', 144' and 145' are connected to terminals 90, 91, 92, 93, and 94, respectively, of multiplex switch 110 and presence at respective ones of the switch terminals of gating pulses in the sequential manner, as previously described, causes multiplexing of antennas 21, 22, 23, 24, and 25. Sequential transmission of ILS signals present at the laterally spaced antennas to the single receiver channel including ILS receiver 20 where averaging of audio guidance signal information is performed in 90 Hz filter 82 and 150 Hz filter 83 in the manner previously described. As indicated in FIG. 1, the output of the averaged audio guidance information after rectification in ILS receiver rectifiers 87 and 88 provides the composite guidance signal present at receiver output terminal 84 which is utilized in autopilot 150 or crosspointer indicator 151 which is a standardized meter having a full scale deflection of ± 150 microamperes.

Turning now to the detailed schematic of multiplex switch 110 shown in FIG. 4 which provides solid state diode switching, it can be seen that with the diodes 201 arranged as shown, the presence of a gating pulse negative in polarity transmitted from the multiplex switch drive circuitry 100 and applied to one of multiplex switch terminals 90, 91, 92, 93 or 94 will cause to be turned on the corresponding pair of diodes 201 coupled to that particular terminal by way of r.f. coupling capacitor 202, thereby causing r.f. energy received by the selected ILS antenna to be coupled from the common terminal 205 of multiplex switch 110 through coupling capacitor 202 to input port 81 of ILS receiver 20. Inductances 210 connected between the multiplex switch terminals 90, 91, 92, 93, and 94 and the signal path point between coupling capacitor 202 and series connected diodes 201 together with capacitors 211 connected between these terminals and ground comprise filters which provide for transmission of gating pulses from these switch terminals to the diodes 201 for switching while preventing flow and consequent loss of the r.f. signal back through the switching terminals. The r.f. ports 90', 91', 92', 93', 94' and the output port connected to receiver input port 81 comprise low loss r.f. type coaxial connectors and the conductive leads of the multiplex switch used comprised deposited stripline.

Figure 6:
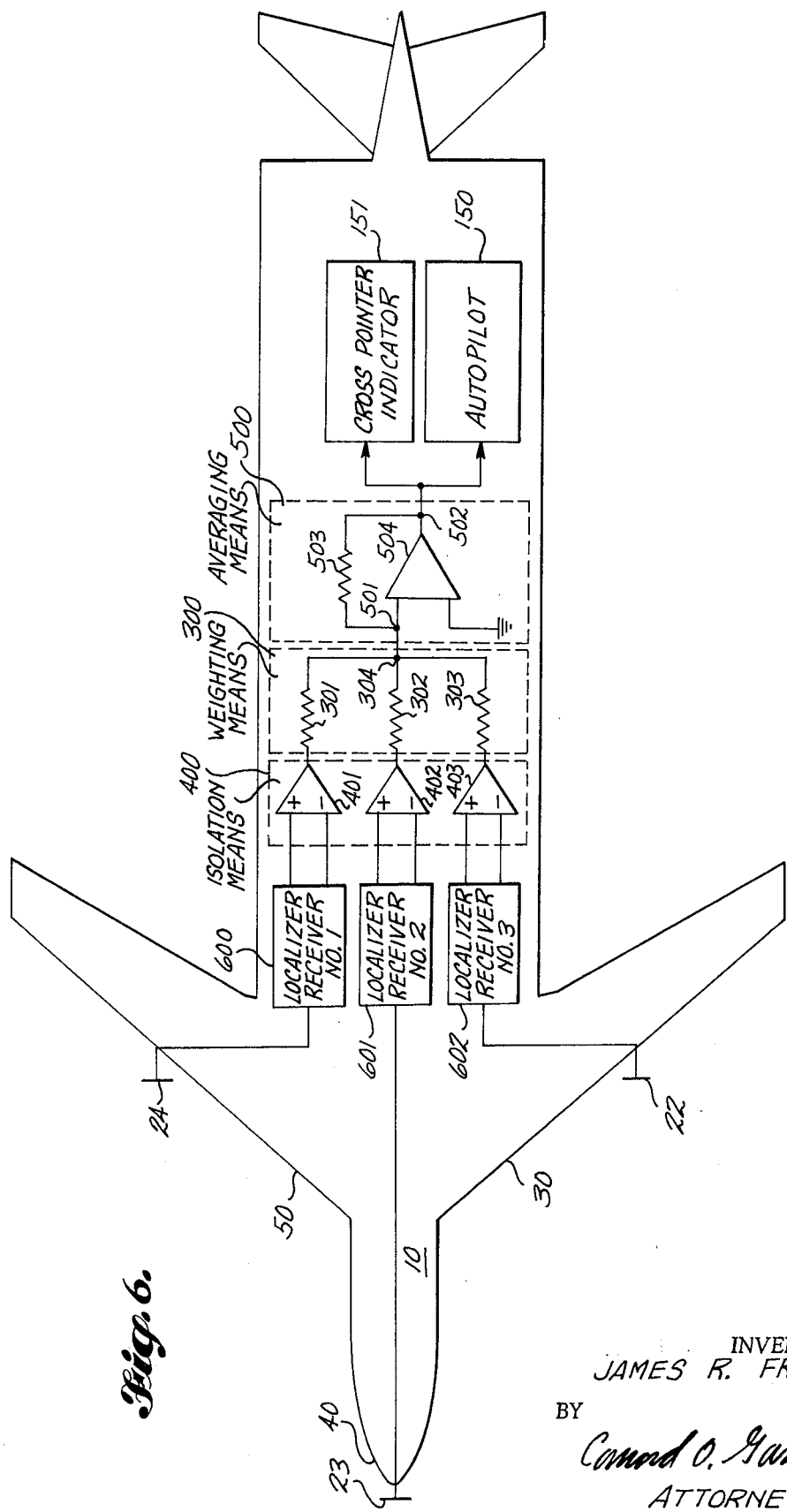
FIG. 6 is a schematic diagram partially in block form of a further embodiment of the invention utilizing a plurality of ILS receiver channels in parallel.

Typical values of circuit components used successfully in multiplex switch 110 included:

| | |
|---|---|
| diodes 110 | = (HPA) pin chip type 0012 |
| capacitors 202, 211 | = 290 picofarad |
| resistor 212 | = 47 ohm, 1/4 watt, 10% tol. |
| inductors 210 | = 2.2 millihenry |
| | (WEE-DUCTOR) |

Where multiple ILS receivers and antennas are utilized in autoland systems for the purpose of providing redundancy and reliability, a rearrangement of antennas and utilization of the already available ILS receivers in combination with added circuitry as shown in FIG. 6 permits the present invention to be practiced and the previously mentioned improvements to be realized. Instead of time averaging of the guidance signals subsequent to detection within the 90 and 150 Hz filters of a single receiver channel, as in the previous embodiment, the system embodiment of FIG. 6 averages the guidance information signals subsequent to their individual processing by ILS receivers and conversion into d.d.m. signals at the outputs of the ILS receivers. Whereas weighting of signals in the previous embodiment can be accomplished as mentioned previously by modifying the dwell times of the switch by adjusting the gating pulses, this same weighting is accomplished in the weighting means 300 of embodiment of FIG. 6 by means of weighting network resistors 301, 302, and 303 which have values selected to provide the desired weighting for the purpose hereinbefore mentioned in connection with the previous embodiment where the individual antennas were multiplexed to a single receiver channel. In FIG. 6, it is seen that right midwing antenna 24, nose antenna 23, and left midwing antenna 22 provide the r.f. inputs to the first, second and third signal processing channels comprising first localizer receiver 600, second localizer receiver 601, and third localizer receiver 602. Coupled to the outputs of the first, second, and third localizer receivers 600, 601, and 602, respectively in the first, second, and third signal processing channels are isolation amplifiers 401, 402, and 403 having differential input from the respective receivers and providing single ended outputs to the respective weighting resistors 301, 302, and 303 Weighting resistors 301, 302, and 303 are connected together at 304 and coupled to the input terminal 501 of averaging means 500 where the individually weighted signals are averaged to provide the composite guidance signal at output terminal 502. Output terminal 502 of averaging means 500 is then coupled to utilization means such as either or both (as shown) crosspointer indicator 151 to give visible pilot indication of deviation from center of runway and autopilot 150 for lateral control of aircraft 10 during landing. Operational amplifier 504 and resistor 503 coupled between input terminal 501 and output terminal 502 of averaging means 500 averages the individually weighted signals previously added at output terminal 304 of weighting means 300. Comparisons of the outputs of the single nose antenna 23 generated guidance signal appearing at the output of localizer receiver 601 with the composite guidance signal appearing at averaging means output terminal 502 as recorded on f.m. tape provided a graphic measure of the improvement achieved by the system of FIG. 6 which confirmed the theoretical results hereinbefore developed. Actual test comparison of aircraft control characteristics such as roll angle, wheel activity and deviation from desired ground track with and without the deployment of the plural antenna type system of the present invention gave a measure of the over-all improvement in actual performance which can be achieved which also closely confirmed the aforementioned predicted results theoretically obtainable. The addition of two additional antennas as in the FIG. 2 embodiment broaden the frequency band of noise rejection and increase the amount of rejection provided over the three antenna embodiment of FIG. 6; however, increasing the FIG. 6 system to include five antenna performance would require the addition of more equipment, viz., two additional ILS receivers, and this must be taken into account in a determination of the desirability of either the FIG. 1 or FIG. 6 system for a particular application While the present systems provide improvements in ILS localizer lateral guidance information signal processing in the radio frequency band of 108 to 112 megahertz, it must be recognized that the ILS glide slope signals are also subject to beam distortion and that improvement to reduce noise in a similar manner as done in the previously disclosed systems would require multiple antennas, however, vertically oriented with respect to the runway and mounted on the top and bottom of the fuselage along with a center or mid-channel antenna on the aircraft nose to provide an improved composite vertical guidance signal. It should be noted that in practicing the concepts of this invention in the glide slope system to provide noise reduced vertical guidance information, the higher frequency of the glide slope system (330 megahertz) would allow the use of smaller separations between antennas than was the case at the 110 megahertz frequency.

It is to be understood that the above-described arrangements are illustrative of the applications of the principles of the invention, and other arrangements may be derived by those skilled in the art without departing from the spirit and scope of the invention.

I claim:

1. Apparatus for instrument landing system of aircraft comprising first antenna means, second antenna means and third antenna means disposed in predetermined spaced apart relationship on said aircraft, receiver means for receiving guidance information signals, means for coupling said receiver means to said first, second and third antenna means, said receiver means including audio detection means, utilization means, and means coupled between said audio detection means and said utilization means for averaging the signals sensed by said first, second, and third antenna means and detected by said audio detection means.

2. Apparatus according to claim 1 wherein said means for coupling said receiver means to said first, second, and third antenna means comprises multiplex switching means.

3. Apparatus according to claim 2 wherein said multiplex switching means comprises multiplex switch drive circuitry coupled to a multiplex switch.

4. Apparatus according to claim 3, further comprising fourth antenna means and fifth antenna means disposed in predetermined spaced apart relationship with respect to said first, second, and third antenna means, said fourth and fifth antenna means also coupled to said receiver means by said multiplex switching means.

5. Apparatus according to claim 4 wherein said predetermined spaced apart relationship equals about 30 feet.

6. Apparatus according to claim 4 wherein the dwell time of said multiplex switching means on each of said antenna means equals about 36 microseconds.

7. Apparatus according to claim 4 wherein said multiplex switch drive circuitry comprises binary clock means, modulo five counter means and binary to decimal decoder means, said binary clock means coupled to said modulo five counter means for transmitting timing pulses to said modulo five counter, said modulo five counter means coupled to said binary decimal decoder for providing gating pulses to said multiplex switch.

8. Apparatus according to claim 1 wherein said receiving means comprises first, second, and third receivers, said means for coupling said receiver means to said first, second, and third antennas comprising first coaxial transmission line means coupled between said first antenna means and said first receiver, second coaxial transmission line means coupled between said second antenna means and said second receiver, and third coaxial transmission line means coupled between said third antenna means and said third receiver.

9. Apparatus according to claim 8 wherein said means coupled between said audio detection means and said utilization means for averaging the signals by said first, second, and third antenna means comprises means coupled between the outputs of said first, second, and third receivers and said utilization means.

10. Apparatus according to claim 9 wherein said means for averaging said signals comprises operational amplifier means.

11. Apparatus according to claim 9 further including weighting means coupled between said audio detection means and said means for averaging said signals.

12. Method of deriving lateral guidance signal information for lateral control of an aircraft during touchdown comprising the steps of:

sensing course deviation signals at multiple points across the approach path of said aircraft, and averaging said course deviation signals to provide said lateral guidance signal information.

13. The method according to claim 12 wherein said course deviation signals are sequentially sensed at multiple points across the approach path of said aircraft.

* * * * *